United States Patent
Ratnakar et al.

(10) Patent No.: US 8,482,581 B2
(45) Date of Patent: *Jul. 9, 2013

(54) SELECTIVE DISPLAY OF OCR'ED TEXT AND CORRESPONDING IMAGES FROM PUBLICATIONS ON A CLIENT DEVICE

(75) Inventors: Viresh Ratnakar, Los Altos, CA (US); Frances Haugen, Mountain View, CA (US); Ashok Popat, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/615,024

(22) Filed: Sep. 13, 2012

(65) Prior Publication Data

US 2013/0002710 A1    Jan. 3, 2013

Related U.S. Application Data

(63) Continuation of application No. 12/366,547, filed on Feb. 5, 2009, now Pat. No. 8,373,724.

(60) Provisional application No. 61/147,901, filed on Jan. 28, 2009.

(51) Int. Cl.
*G09G 5/14* (2006.01)
*G06T 11/00* (2006.01)
*G06T 11/60* (2006.01)
*G06T 11/20* (2006.01)

(52) U.S. Cl.
CPC ............... *G06T 11/00* (2013.01); *G06T 11/60* (2013.01); *G06T 11/206* (2013.01)
USPC ............ 345/619; 345/581; 345/629; 345/589

(58) Field of Classification Search
CPC .......... G06T 11/00; G06T 11/60; G06T 11/206
USPC ........................................ 345/619, 581, 629
See application file for complete search history.

(56) References Cited

U.S. PATENT DOCUMENTS 7,639,387 B2 * 12/2009 Hull et al. ............... 358/1.18
7,669,148 B2 *  2/2010 Hull et al. ................. 715/864

(Continued)

FOREIGN PATENT DOCUMENTS

JP    HEI 05-081467    4/1993
JP    HEI 07-249098    9/1995

(Continued)

OTHER PUBLICATIONS

Notice of Grounds for Rejection for Japanese Patent Application No. JP 2011-548186, Feb. 26, 2013, 4 Pages.

*Primary Examiner* — Javid A Amini
(74) *Attorney, Agent, or Firm* — Fenwick & West LLP

(57) ABSTRACT

Text is extracted from a source image of a publication using an Optical Character Recognition (OCR) process. A document is generated containing text segments of the extracted text. The document includes a control module that responds to user interactions with the displayed document. Responsive to a user selection of a displayed text segment, a corresponding image segment from the source image containing the text is retrieved and rendered in place of the selected text segment. The user can select again to toggle the display back to the text segment. Each text segment can be tagged with a garbage score indicating its quality. If the garbage score of a text segment exceeds a threshold value, the corresponding image segment can be automatically displayed instead.

20 Claims, 8 Drawing Sheets

U.S. PATENT DOCUMENTS

| | | | |
|---|---|---|---|
| 8,156,427 B2 * | 4/2012 | Graham et al. | 715/254 |
| 2006/0253491 A1 * | 11/2006 | Gokturk et al. | 707/104.1 |
| 2007/0106721 A1 * | 5/2007 | Schloter | 709/200 |
| 2008/0149713 A1 * | 6/2008 | Brundage | 235/435 |
| 2008/0267504 A1 * | 10/2008 | Schloter et al. | 382/181 |
| 2010/0192178 A1 * | 7/2010 | Candelore | 725/39 |
| 2011/0128288 A1 * | 6/2011 | Petrou et al. | 345/428 |

FOREIGN PATENT DOCUMENTS

| | | |
|---|---|---|
| JP | 2002-049890 | 2/2002 |
| JP | 2005-352735 | 12/2005 |
| JP | 2006-031299 | 2/2006 |

\* cited by examiner

SELECTIVE DISPLAY OF OCR'ED TEXT AND CORRESPONDING IMAGES FROM PUBLICATIONS ON A CLIENT DEVICE

CROSS-REFERENCE TO RELATED APPLICATIONS

This application is a continuation of U.S. patent application Ser. No. 12/366,547, filed on Feb. 5, 2009, entitled "Selective Display of OCR'ed Text and Corresponding Images from Publications in a Client Device," which claims the benefit and priority of U.S. Provisional Patent Application No. 61/147,901, filed on Jan. 28, 2009, entitled "Click to Toggle OCR'd text with Image," which are incorporated by reference herein in their entirety.

BACKGROUND

1. Field of Disclosure

The disclosure generally relates to the field of optical character recognition (OCR), in particular to displaying text extracted using OCR and the original images from which the text was extracted.

2. Description of the Related Art

As more and more printed documents have been scanned and converted to editable text using Optical Character Recognition (OCR) technology, people increasingly read such documents using computers. When reading a document on a computer screen, users typically prefer the OCR'ed version over the image version. Compared to the document image, the OCR'ed text is small in size and thus can be transmitted over a computer network more efficiently. The OCR'ed text is also editable (e.g., supports copy and paste) and searchable, and can be displayed clearly (e.g., using a locally available font) and flexibly (e.g., using a layout adjusted to the computer screen), providing a better reading experience. The above advantages are especially beneficial to those users who prefer to read on their mobile devices such as mobile phones and music players.

However, errors often exist in the OCR'ed text. Such errors may be due to imperfections in the documents, artifacts introduced during the scanning process, and shortcomings of OCR engines. These errors can interfere with use and enjoyment of the OCR'ed text and detract from the advantages of such text. Therefore, there is a need for a way to realize the benefits of using OCR'ed text while minimizing the impact of errors introduced by the OCR process.

SUMMARY

Embodiments of the present disclosure include a method (and corresponding system and computer program product) for displaying text extracted from an image using OCR.

In one aspect, an OCR'ed document is generated for a collection of OCR'ed text segments. Each text segment in the document is tagged with information that uniquely identifies a rectangular image segment containing the text segment in the original text image in the sequence of images from the original document. The document also contains program code that enables a reader to toggle the display of a text segment between the OCR'ed text and the corresponding image segment responsive to a user selection.

In another aspect, a garbage score is calculated for each text segment. Each text segment in the OCR'ed document is tagged with its garbage score. When the OCR'ed document is loaded, the embedded program code compares the garbage score of each text segment with a threshold value. If the garbage score of a text segment is below the threshold, the program code displays the text segment. Otherwise, the program code displays the image segment in place of the text segment. The user can toggle the display by selecting the text segment.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables readers of OCR'ed text to conveniently toggle a display between a segment of OCR'ed text and a segment of the source image containing the text segment.

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
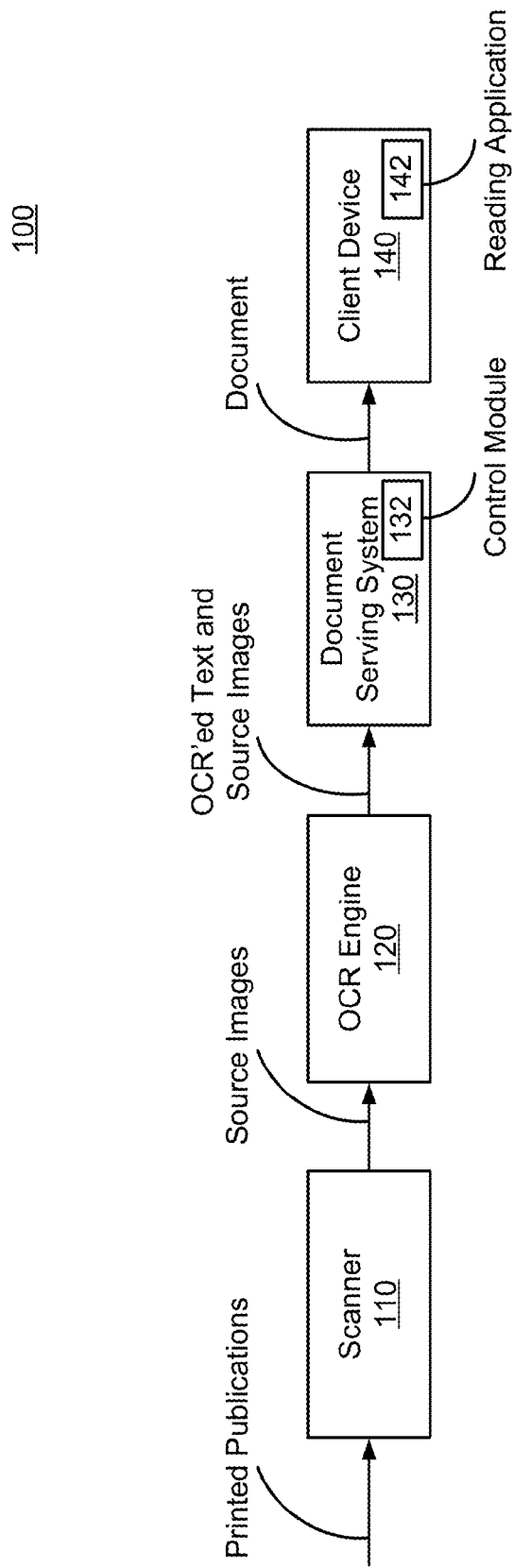
FIG. 1 is a high-level block diagram of a computing environment according to one embodiment of the present disclosure.

FIG. 1 is a high-level block diagram that illustrates a computing environment 100 for converting printed publications into OCR'ed text and allowing readers to view the OCR'ed text and corresponding source image as desired, according to one embodiment of the present disclosure. As shown, the computing environment 100 includes a scanner 110, an OCR engine 120, a document serving system 130, and a client device 140. Only one of each entity is illustrated in order to simplify and clarify the present description. There can be other entities in the computing environment 100 as well. In some embodiment, the OCR engine 120 and the document serving system 130 are combined into a single entity.

The scanner 110 is a hardware device configured to optically scan printed publications (e.g., books, newspapers) and convert the printed publications to digital text images. The output of the scanner 110 is fed into the OCR engine 120.

The OCR engine 120 is a hardware device and/or software program configured to convert (or translate) source images into editable text (hereinafter called OCR'ed text). The OCR engine 120 processes the source images using computer algorithms and generates corresponding OCR'ed text.

In addition, the OCR engine 120 generates and outputs positional information describing the image segments containing the OCR'ed text in the source images. For example, for each segment of text (e.g., paragraph, column, title), the OCR engine 120 provides a set of values describing a bounding box that uniquely specifies the segment of the source image containing the text segment. The values describing the bounding box include two-dimensional coordinates of the top-left corner of a rectangle on an x-axis and a y-axis, and a width and a height of the rectangle. Therefore, the bounding box uniquely identifies a region of the source image as the image segment corresponding to the text segment. In other embodiments the bounding box can specify image segments using shapes other than rectangle.

The OCR engine 120 may also generate a confidence level that measures a quality of the OCR'ed text. In addition, the OCR engine 120 may generate other information such as format information (e.g., font, font size, style). Examples of the OCR engine 120 include ABBYY FineReader OCR, ADOBE Acrobat Capture, and MICROSOFT Office Document Imaging. The output of the OCR engine 120 is fed into the document serving system 130.

The document serving system 130 is a computer system configured to provide electronic representations of the printed publications to users. The document serving system 130 stores information received from the OCR engine 120 including the OCR'ed text, the source images, the positional information relating segments of the OCR'ed text to segments of the source images, and the confidence levels. In one embodiment, the document serving system 130 uses the received information to calculate a "garbage score" for each text segment of the OCR'ed text that measures its overall quality. In addition, the document serving system 130 includes a control module 132 that can be executed by client devices 140. The control module 132 allows users of the client devices 140 to selectively toggle display of a text segment and the corresponding image segment, thereby allowing the user to view either the OCR'ed text or the portion of the source image of the printed publication from which the text was generated.

In one embodiment, the document serving system 130 provides a website for users to read OCR'ed printed publications as web pages using client devices 140. Upon receiving a request from a client device for a particular portion of a printed publication, the document serving system 130 generates a document (e.g., a web page) containing the requested portion of the publication. In one embodiment, the document includes the text segments in the requested portion of the publication (e.g., the text for a chapter of a book). In addition, the document includes the positional information relating the text segments to the corresponding image segments, and the garbage scores for the text segments. The document also includes the control module 132. The document serving system 130 provides the generated document to the requesting client device 140.

The client device 140 is a computer system configured to request documents from the document serving system 130 and display the documents received in response. This functionality can be provided by a reading application 142 such as a web browser (e.g., Microsoft Internet Explorer™, Mozilla Firefox™, and Apple Safari™) executing on the client device 140. The reading application 142 executes the control module 132 included in the document received from the document serving system 130, which in turn allows the user to toggle the portions of the document between display of the text segment and display of the corresponding image segment.

The scanner 110 is communicatively connected with the OCR engine 120; the OCR engine 120 is communicatively connected with the document serving system 130; and the document serving system 130 is communicatively connected with the client device 140. Any of the connections may be through a wired or wireless network. Examples of the network include the Internet, an intranet, a WiFi network, a WiMAX network, a mobile telephone network, or a combination thereof.

Computer Architecture

Figure 2:
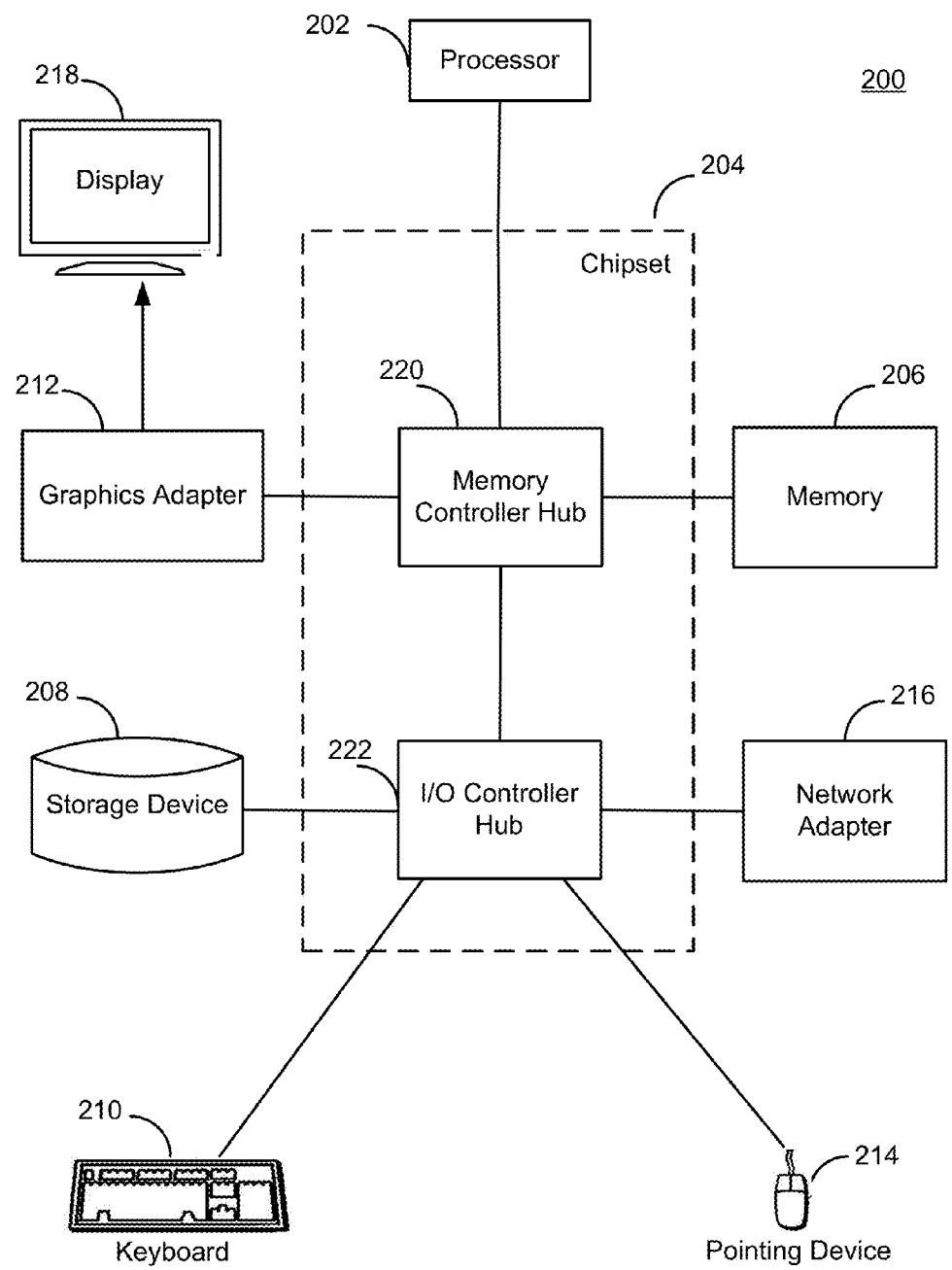
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the document serving system 130 might comprise multiple blade servers working together to provide the functionality described herein. As another example, the client device 140 might comprise a mobile telephone with limited processing power. The computers 200 can lack some of the components described above, such as keyboards 210, graphics adapters 212, and displays 218.

Example Architectural Overview of the Document Serving System

Figure 3:
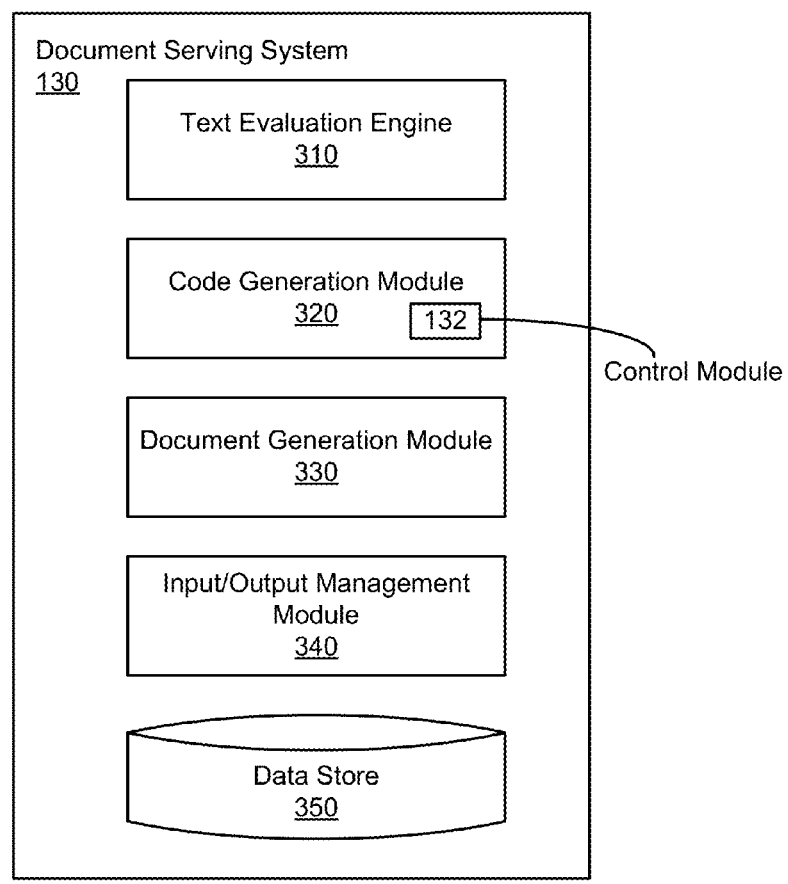
FIG. 3 is a high-level block diagram illustrating modules within a document serving system according to one embodiment of the present disclosure.

FIG. 3 is a high-level block diagram illustrating a detailed view of modules within the document serving system 130 according to one embodiment. Some embodiments of the document serving system 130 have different and/or other modules than the ones described herein. Similarly, the functions can be distributed among the modules in accordance with other embodiments in a different manner than is described here. As illustrated, the document serving system 130 includes a text evaluation engine 310, a code generation module 320, a document generation module 330, an Input/Output management module (hereinafter called the I/O module) 340, and a data store 350.

The text evaluation engine 310 generates garbage scores for text segments based on information provided by the OCR engine 120. The garbage score is a numeric value that measures an overall quality of the text segment. In one embodiment, the garbage score ranges between 0 and 100, with 0 indicating high text quality and 100 indicating low text quality.

To generate the garbage score, an embodiment of the text evaluation engine 310 generates a set of language-conditional character probabilities for each character in a text segment. Each language-conditional character probability indicates how well the character and a set of characters that precede the character in the text segment concord with a language model. The set of characters that precede the character is typically limited to a small number (e.g. 4-8 characters) such that characters in compound words and other joint words are given strong probability values based on the model. The language-conditional character probabilities may be combined with other indicators of text quality (e.g., the confidence levels provided by the OCR engine 120) to generate a text quality score for each character in the text segment. The calculation of such a value allows for the location-specific analysis of text quality.

The text evaluation engine 310 combines the set of text quality scores associated with the characters in a text segment to generate a garbage score that characterizes the quality of the text segment. The text evaluation engine 310 may average the text quality scores associated with the characters in the text segment to generate the garbage score.

The code generation module 320 generates or otherwise provides the control module 132 that controls display of the document on the client device 140. In one embodiment, the control module 132 is implemented using browser-executable code written using a programming language such as JAVASCRIPT, JAVA, or Perl. The code generation module 320 can include or communicate with an application such as the Google Web Toolkit and/or provide an integrated development environment (IDE) allowing developers to develop the control module 132. Depending upon the embodiment, the code generation module 320 can store a pre-created instance of the control module 132 that can be included in documents provided to the client devices 140 or can form a control module 132 in real-time as client devices 140 request documents from the document serving system 130.

The document generation module 330 generates the documents providing portions of the publications to the requesting client devices 140. In one embodiment, the generated documents are web pages formed using the Hypertext Markup Language (HTML). Other embodiments generate documents that are not web pages, such as documents in the Portable Document Format (PDF), and/or web pages formed using languages other than HTML.

To generate a document, the document generation module 330 identifies the publication and portion being requested by a client device 140, and retrieves the text segments constituting that portion from the data store 350. The document generation module 330 creates a document having the text segments, and also tags each text segment in the document with the positional information relating the text segment to the corresponding image segment from the source image. The document generation module 330 also tags each text segment with its associated garbage score. In addition, the document generation module 330 embeds the control module 132 provided by the code generation module 320 in the document. The document generation module 330 may generate the document when the OCR'ed text becomes available. Alternatively, the document generation module 330 may dynamically generate the document on demand (e.g., upon request from the client device 140).

The I/O module 340 manages inputs and outputs of the document serving system 130. For example, the I/O module 340 stores data received from the OCR engine 120 in the data store 350 and activates the text evaluation engine 310 to generate corresponding garbage scores. As another example, the I/O module 340 receives requests from the client device 140 and activates the document generation module 330 to provide the requested documents in response. If the document serving system receives a request for an image segment, the I/O module 340 retrieves the image segment from the data store 350 and provides it to the client device 140. In one embodiment, the I/O module 340 processes the image segment before returning it to the client device 140. For example, the I/O module 340 may adjust a size and/or a resolution of the image segment based on a resolution of the screen of the client device 140 displaying the document.

The data store 350 stores data used by the document serving system 130. Examples of such data include the OCR'ed text and associated information (e.g., garbage scores, positional information), source images, and generated documents. The data store 350 may be a relational database or any other type of database.

Document and Control Module

According to one embodiment, the document serving system 130 generates documents with embedded control modules 132. A document contains text segments tagged with information for identifying the corresponding image segments. The text segments are also tagged with format information designed to imitate the original text in the source image. Such format information includes font, font size, and style (e.g., italic, bold, underline).

An embodiment of the control module 132 includes event handlers that handle events related to the document. For example, responsive to the document being loaded into a web browser at a client device 140 (an on-load event), the control module 132 generates a display of the included text segments using HTML text tags. As another example, responsive to a user selection of a text segment, the control module 132 toggles the display between the text segment and the corresponding image segment.

In one embodiment, when the web page is loaded by a web browser, the embedded control module compares the garbage score of each text segment with a threshold value to determine whether the text segment is of sufficient quality for display. If the garbage score equals or is below the threshold value, the control module displays the text segment using HTML code such as the following:

```
<p
id='pageID.40.paraID.1.box.103.454.696.70.garbage.40'>
<i>The courtyard of the Sheriff's house. A chapel. A
shed in which is a blacksmith's forge with fire. A
prison near which is an anvil, before which Will Scarlet
is at work making a sword.</i></p>
```

The above HTML code includes the following text in italic style: "The courtyard of the Sheriff's house. A chapel. A shed in which is a blacksmith's forge with fire. A prison near which is an anvil, before which Will Scarlet is at work making a sword." The paragraph is tagged with the following information "id='pageID.40.paraID.1.box.103.454.696.70.garbage.40'", indicating that the corresponding image segment is located on page 40 (pageID.40), paragraph 1 (paraID.1), that the top-left corner of the image segment is located at (103, 454), that the image segment is 696 pixels in height and 70 pixels in length, and that the associated garbage score is 40 (garbage.40).

If the garbage score exceeds the threshold value, the control module 132 automatically retrieves the image segment and displays the image segment instead of the text segment using HTML code such as the following:

```
<p id='pageID.40.paraID.1.box.103.454.696.70.
garbage.40'><img
src="image?bookID=0123&pageID=40&paraID=1&x=103&y=454&h=
696&w=70" display="100%"></p>
```

The above HTML code retrieves an image segment containing the same text as the paragraph above, and displays the image segment in place of the text segment. It is noted that the bookID can be hardcoded in the document by the document generation module 330. The threshold value can be set by a user or preset in the document.

A user can also specify whether the document displays a text segment or an image segment. For example, the user can use a keyboard or a pointing device to activate the text segment, or tap the text segment on a touch sensitive screen. Responsive to a user selection, the control module 132 dynamically toggles the display between the text segment and the corresponding image segment. When the display is toggled from the text segment to the image segment, the control module 132 requests the image segment from the document serving system 130 with information that uniquely identifies the image segment (e.g., page number, paragraph number, binding box), inserts an image tag of the image segment into the web page, and renders the image segment to the user in place of the OCR' ed text. Even though it is not displayed, the text segment is stored in a local variable such that when the user toggles back, the corresponding text can be readily displayed.

Typically when an image segment is displayed, the control module 132 configures the display to be 100%, indicating that the image should be resized to fill up the whole width of the screen. However, when a text segment (e.g., a short utterance or a title line such as "Chapter One") is very short (e.g., less than 50% of a line), the control module can be configured to display the image as a similar percentage of the screen width.

Overview of Methodology for the Document Serving System

Figure 4:
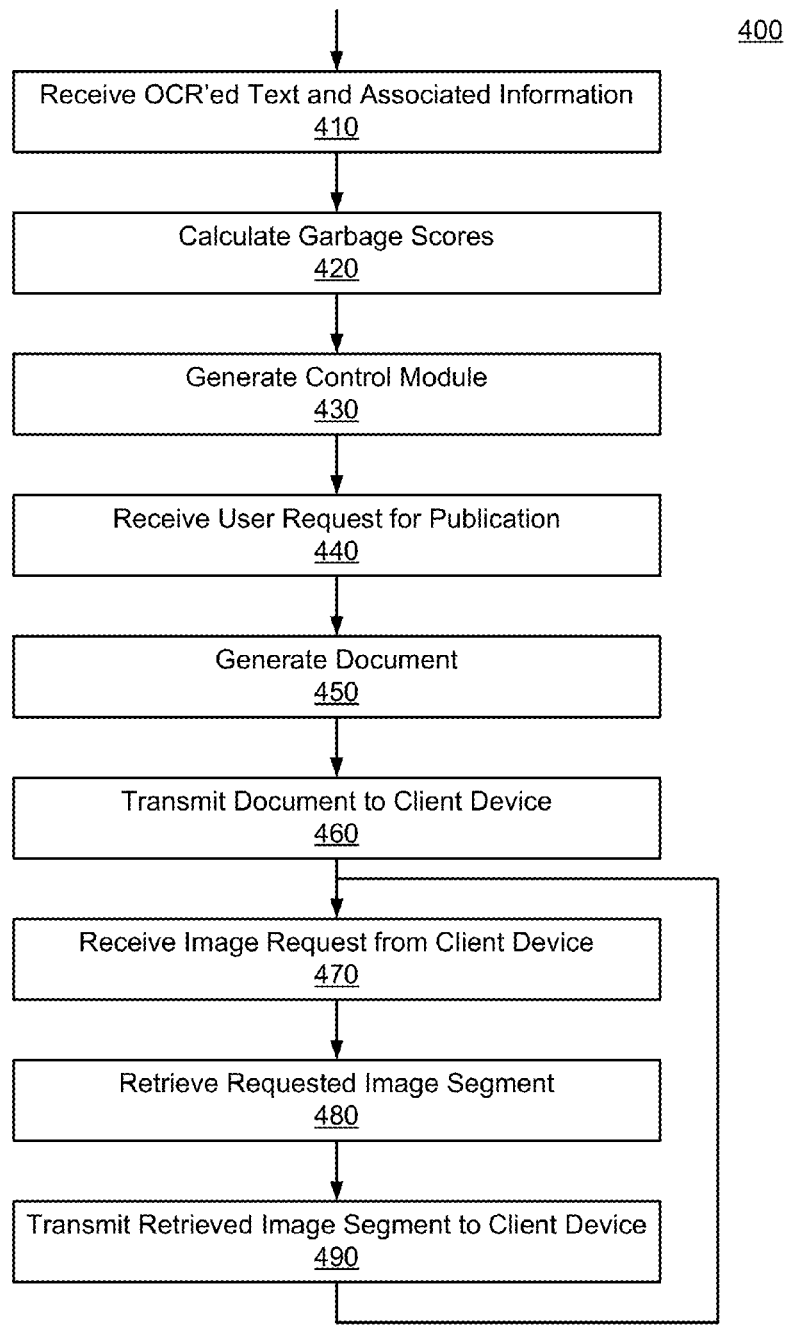
FIG. 4 is a flow diagram that illustrates the operation of the document serving system according to one embodiment of the present disclosure.

FIG. 4 is a flowchart illustrating a method 400 for the document serving system 130 to interactively provide a document to a client device 140 for viewing by a user according to one embodiment. Other embodiments can perform the steps of the method 400 in different orders. Moreover, other embodiments can include different and/or additional steps than the ones described herein. The document serving system 130 can perform multiple instances of the steps of the method 400 concurrently and/or in parallel.

Initially, the document serving system 130 receives 410 the OCR'ed text, source images, and associated information (e.g., positional information, confidence levels) from the OCR engine 120. The document serving system 130 calculates 420 a garbage score for each OCR'ed text segment (e.g., through the text evaluation engine 310), and generates 430 a control module 132 to be included in a document (e.g., through the code generation module 320).

The document serving system 130 receives 440 a request from a client device 140 for a portion of a publication (e.g., a chapter of a book), retrieves the text segments constituting the requested portion from the data store 350, and generates 450 a document such as a web page including the text segments. The text segments are tagged with related attributes including the positional information and the garbage scores. The generated document also includes the control module 132. The document serving system 130 transmits 460 the generated document to the client device 140 that requested it.

As described above, the user can interact with the document to view the image segment instead of the corresponding text segment. When the control module 132 executing at the client device 140 receives a request to display an image segment, it transmits an image request with parameters uniquely identifying the image segment to the document serving system 130. The document serving system 130 receives 470 the image request, retrieves 480 the requested image segment, and transmits 490 it to the client device 140 for display. The image request may provide additional information such as a resolution of the screen displaying the document. The document serving system 130 may process the image segment (e.g., resize, adjust resolution) based on such information before transmitting 490 the processed image segment to the client device 140 for display.

Overview of Methodology for the Control Module

Figure 5:
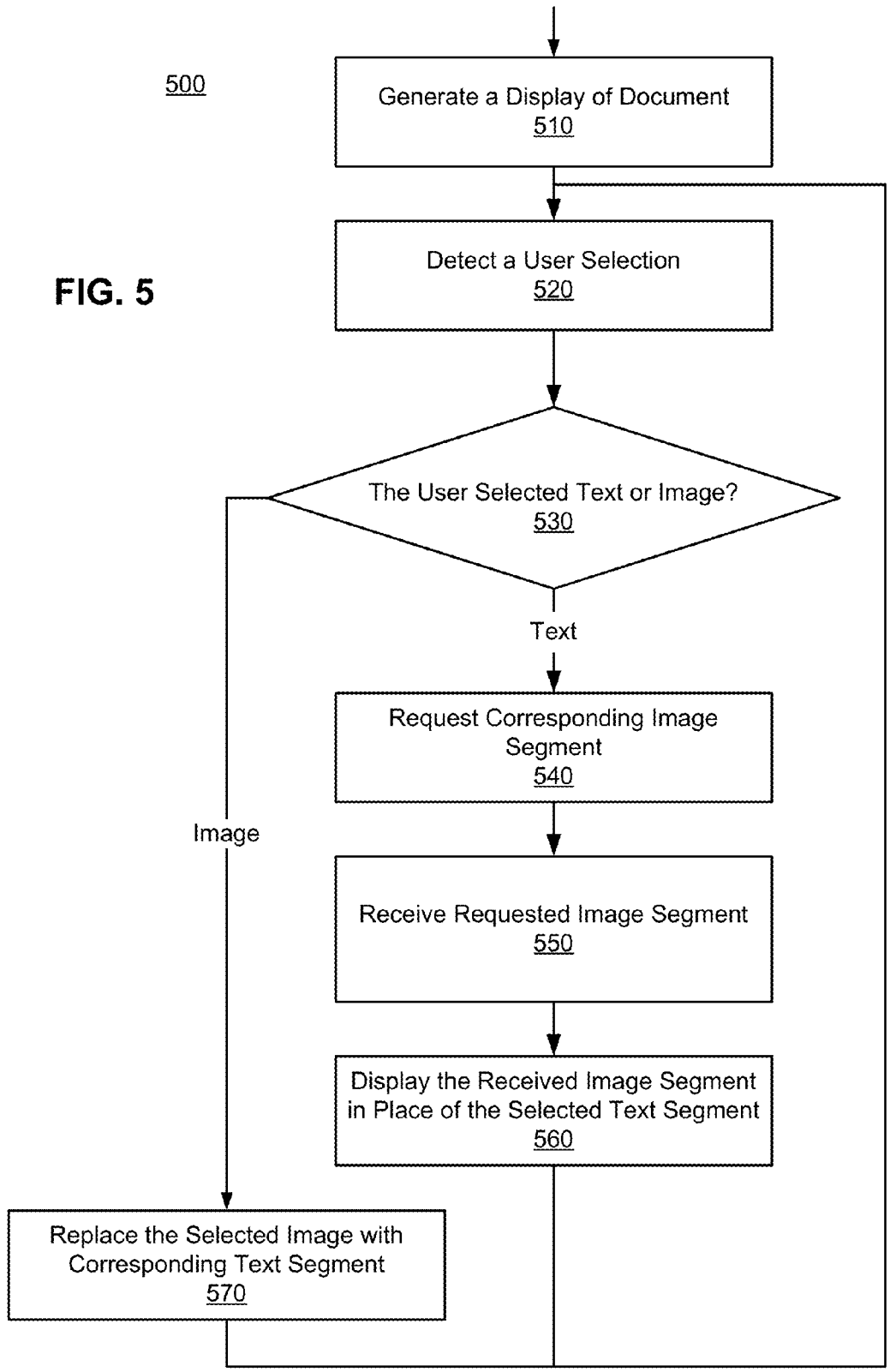
FIG. 5 is a flow diagram that illustrates the operation of a control module generated by the document serving system according to one embodiment of the present disclosure.

FIG. 5 is a flow diagram that illustrates an operation 500 of the control module 132 included in a document according to one embodiment. The control module 132 is executed by the reading application 142 (e.g., a web browser) at the client device 140 when the document is displayed by the application. In an alternative embodiment, the functionality of the control module 132 is provided by the reading application 142 itself (e.g., by a plug-in applet). Thus, the control module 132 needs not be included in the document sent by the document serving system 130 to the client device 140.

As shown, when the document is loaded, the control module 132 generates 510 a display of the document. As described above, the control module 132 compares the garbage score of each text segment with a threshold value to determine whether to display the text segment or the corresponding image segment.

The control module 132 monitors for and detects 520 a user selection of a displayed segment. The control module 132 determines 530 whether the selected segment is currently displayed as a text segment or as an image segment. If the displayed segment is a text segment, the control module 132 requests 540 the corresponding image segment, receives 550 the requested image segment, and displays 560 the received image segment in place of the text segment. Otherwise, the control module 132 replaces 570 the image tag for the image segment with the text segment. In one embodiment, the control module 132 stores the undisplayed text segments locally in the document (e.g., in local JavaScript variables), such that it does not need to request and retrieve the text segment from the document serving system 130 when the user toggles the display back to text. After the display switch, the control module 132 resumes monitoring for user selections.

Example

Figure 6A:
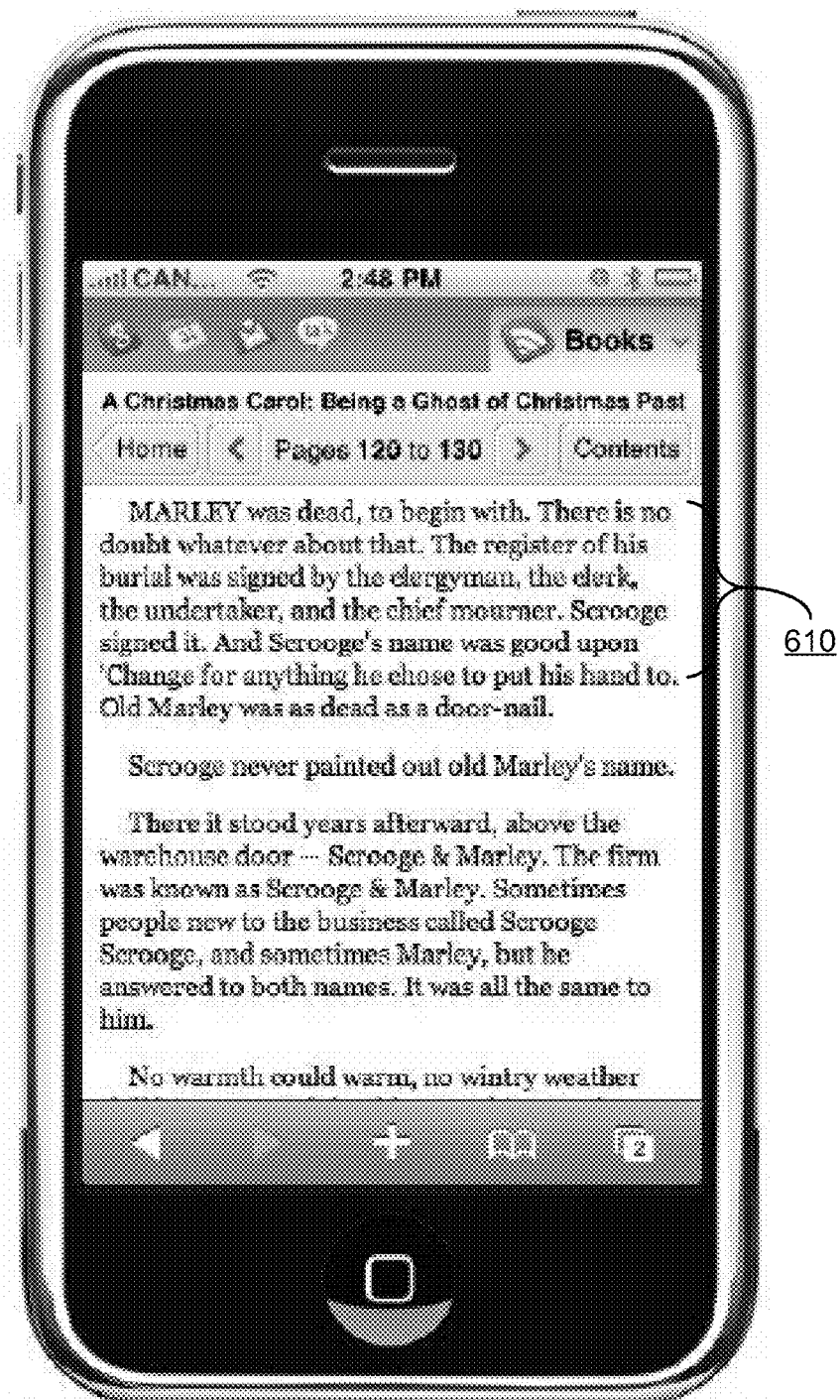
FIGS. 6A-6C are screenshots illustrating a user experience of reading a web page generated by the document serving system according to one embodiment of the present disclosure.
Figure 6B:
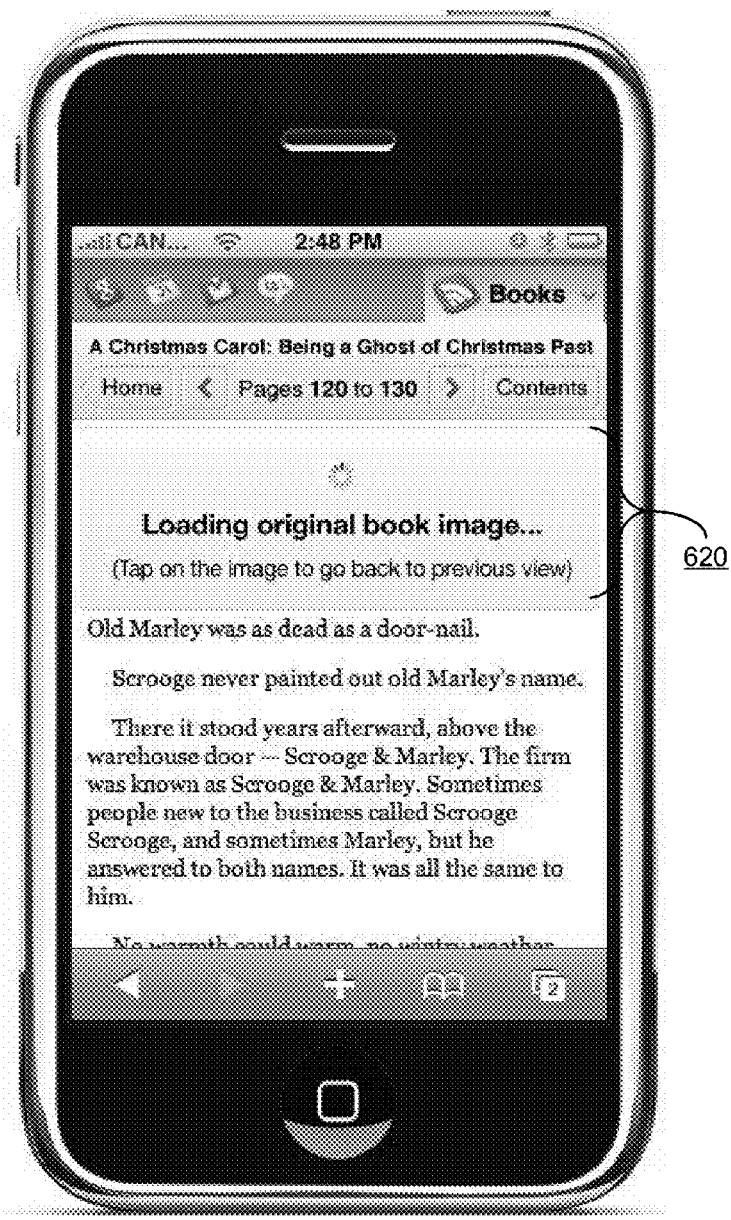
Figure 6C:
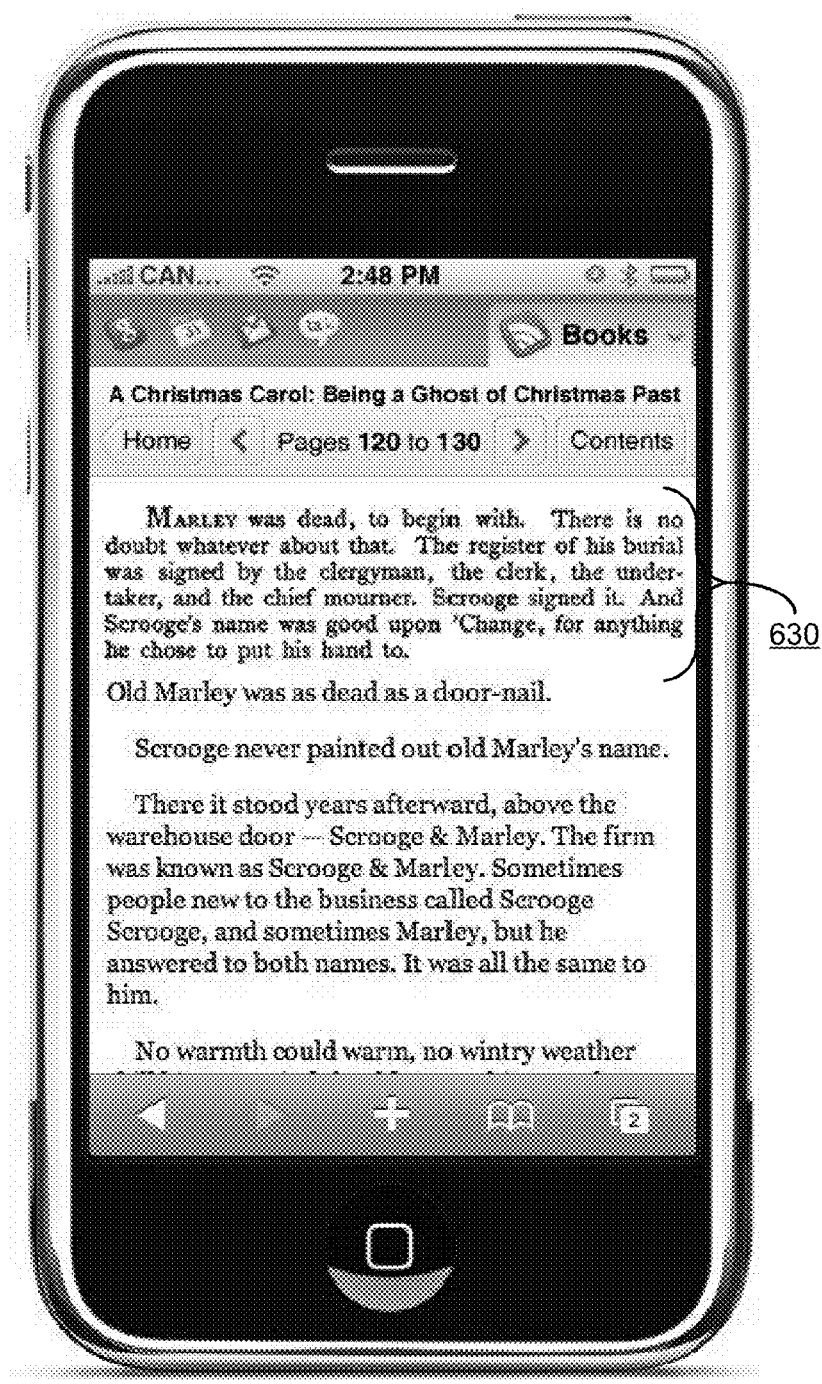

FIGS. 6A-6C are screenshots illustrating a user experience of interacting with a document according to one embodiment of the present disclosure. In this example, the document is a web page. As shown in FIG. 6A, a user retrieves a web page generated for an OCR'ed book titled "A Christmas Carol: Being a Ghost of Christmas Past" using an APPLE iPHONE client. The web page contains pages 120-130 of the book.

The user desires to view the image segment for a paragraph 610, and taps the display of the paragraph. In response, the control module 132 replaces the text segment for the paragraph 610 with an interstitial image 620, as shown in FIG. 6B. The interstitial image 620 shows the text "Loading original book image . . . (Tap on the image to go back to previous view)". The interstitial image 620 is designed to help the users understand the action as well as provide a clear guidance on how to get back. For example, if the network connection of the client device 140 is poor, it may take a while to load the original image segment containing paragraph 610. The user can tap the interstitial image 620 to cancel the action and resume viewing the text segment. The interstitial image 620 also helps with reducing the perceived loading time.

When the image segment 630 is retrieved, the control module 132 swaps in the image segment 630 to replace the text segment, as shown in FIG. 6C. The user can then tap again to revert to the text segment as shown in FIG. 6A.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for displaying OCR'ed text. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for displaying a publication, comprising:
    receiving a document including a plurality of text segments generated responsive to an Optical Character Recognition (OCR) process performed on a source image of the publication, wherein each text segment is associated with a garbage score indicating a quality of the text segment;
    comparing the garbage score of a particular text segment of the plurality of text segments with a threshold value;
    responsive to the garbage score meeting the threshold value, displaying the particular text segment on a display of a client device; and
    responsive to the garbage score not meeting the threshold value, displaying an image segment from which the particular text segment was generated via the OCR process instead of the particular text segment on the display of the client device.

2. The computer-implemented method of claim 1, further comprising:
    responsive to a selection of the image segment by a user, replacing the selected image segment with the particular text segment on the display of the client device.

3. The computer-implemented method of claim 1, wherein the particular text segment is replaced with the image segment from which the particular text segment was generated via the OCR process on the display of the client device responsive to a selection of the particular text segment by a user.

4. The computer-implemented method of claim 1, wherein the document includes positional information relating the included text segments to image segments of the source image, wherein displaying the image segment further comprises:
    identifying positional information in the document for the particular text segment; and
    transmitting a request for the image segment, the request including the identified positional information.

5. The computer-implemented method of claim 4, wherein the request for the image segment is transmitted to a remote server and the image segment is retrieved from the remote server.

6. The computer-implemented method of claim 4, wherein the positional information describes a region of the source image showing text contained in the particular text segment.

7. The computer-implemented method of claim 1, wherein displaying the image segment comprises:
- replacing the particular text segment with the image segment from which the particular text segment was generated via the OCR process in the document.

8. A non-transitory computer-readable storage medium encoded with executable computer program code for displaying a publication, the computer program code comprising program code for:
- receiving a document including a plurality of text segments generated responsive to an Optical Character Recognition (OCR) process performed on a source image of the publication, wherein each text segment is associated with a garbage score indicating a quality of the text segment;
- comparing the garbage score of a particular text segment with a threshold value;
- responsive to the garbage score meeting the threshold value, displaying the particular text segment on a display of a client device; and
- responsive to the garbage score not meeting the threshold value, displaying an image segment from which the particular text segment was generated via the OCR process instead of the particular text segment on the display of the client device.

9. The non-transitory computer-readable storage medium of claim 8, further comprising program code for:
- responsive to a selection of the image segment by a user, replacing the selected image segment with the particular text segment on the display of the client device.

10. The non-transitory computer-readable storage medium of claim 8, wherein the particular text segment is replaced with the image segment from which the particular text segment was generated via the OCR process on the display of the client device responsive to a selection of the particular text segment by a user.

11. The non-transitory computer-readable storage medium of claim 8, wherein the document includes positional information relating the included text segments to image segments of the source image, and wherein the program code for displaying the image segment comprises program code for:
- identifying positional information in the document for the particular text segment; and
- transmitting a request for the image segment, the request including the identified positional information.

12. A computer-implemented method for providing a publication to a user, comprising:
- receiving a document including text segments generated responsive to an Optical Character Recognition (OCR) process performed on a source image of the publication, wherein the text segments are associated with a plurality of garbage scores indicating quality levels of the text segments, and wherein the document also includes positional information specifying segments of the source image from which the text segments were generated via the OCR process;
- providing the document to a client device; and
- responsive to receiving a request from the client device including positional information for an image segment from which a particular text segment included in the document was generated via the OCR process, automatically providing the image segment to the client device, wherein the client device is adapted to display the image segment based on a garbage score from the plurality of garbage scores corresponding to the particular text segment.

13. The computer-implemented method of claim 12, further comprising:
- providing the plurality of garbage scores to the client device.

14. The computer-implemented method of claim 12, further comprising generating a garbage score for an associated text segment, wherein generating the garbage score comprises:
- calculating a set of language-conditional character probabilities for each character in the associated text segment based on a language model; and
- generating the garbage score for the associated text segment based on the set of language-conditional character probabilities for the characters in the associated text segment.

15. The computer-implemented method of claim 12, further comprising:
- including a control module in the document, the control module adapted to execute on the client device to control display of the document on the client device and to automatically generate the request for an image segment from which the particular text segment was generated via the OCR process.

16. The computer-implemented method of claim 12, wherein the positional information describes a region of the source image showing text contained in the particular text segment.

17. A non-transitory computer-readable storage medium encoded with executable computer program code for providing a publication to a user, the computer program code comprising program code for:
- receiving a document including text segments generated responsive to an Optical Character Recognition (OCR) process performed on a source image of the publication, wherein the text segments are associated with a plurality of garbage scores indicating quality levels of the text segments, and wherein the document also includes positional information specifying segments of the source image from which the text segments were generated via the OCR process;
- providing the document to a client device; and
- responsive to receiving a request from the client device including positional information for an image segment from which a particular text segment included in the document was generated via the OCR process, automatically providing the image segment to the client device, wherein the client device is adapted to display the image segment based on a garbage score from the plurality of garbage scores corresponding to the particular text segment.

18. The non-transitory computer-readable storage medium of claim 17, wherein the program code further comprises program code for:
- providing the plurality of garbage scores to the client device.

19. The non-transitory computer-readable storage medium of claim 17, wherein the program code further comprises program code for generating a garbage score for an associated text segment, the program code comprising code for:
- calculating a set of language-conditional character probabilities for each character in the associated text segment based on a language model; and
- generating the garbage score for the associated text segment based on the set of language-conditional character probabilities for the characters in the associated text segment.

20. The non-transitory computer-readable storage medium of claim 17, further comprising program code for:
    including a control module in the document, the control module adapted to execute on the client device to control display of the document on the client device and to automatically generate the request for an image segment from which the particular text segment was generated via the OCR process.

* * * * *